Figure 1:
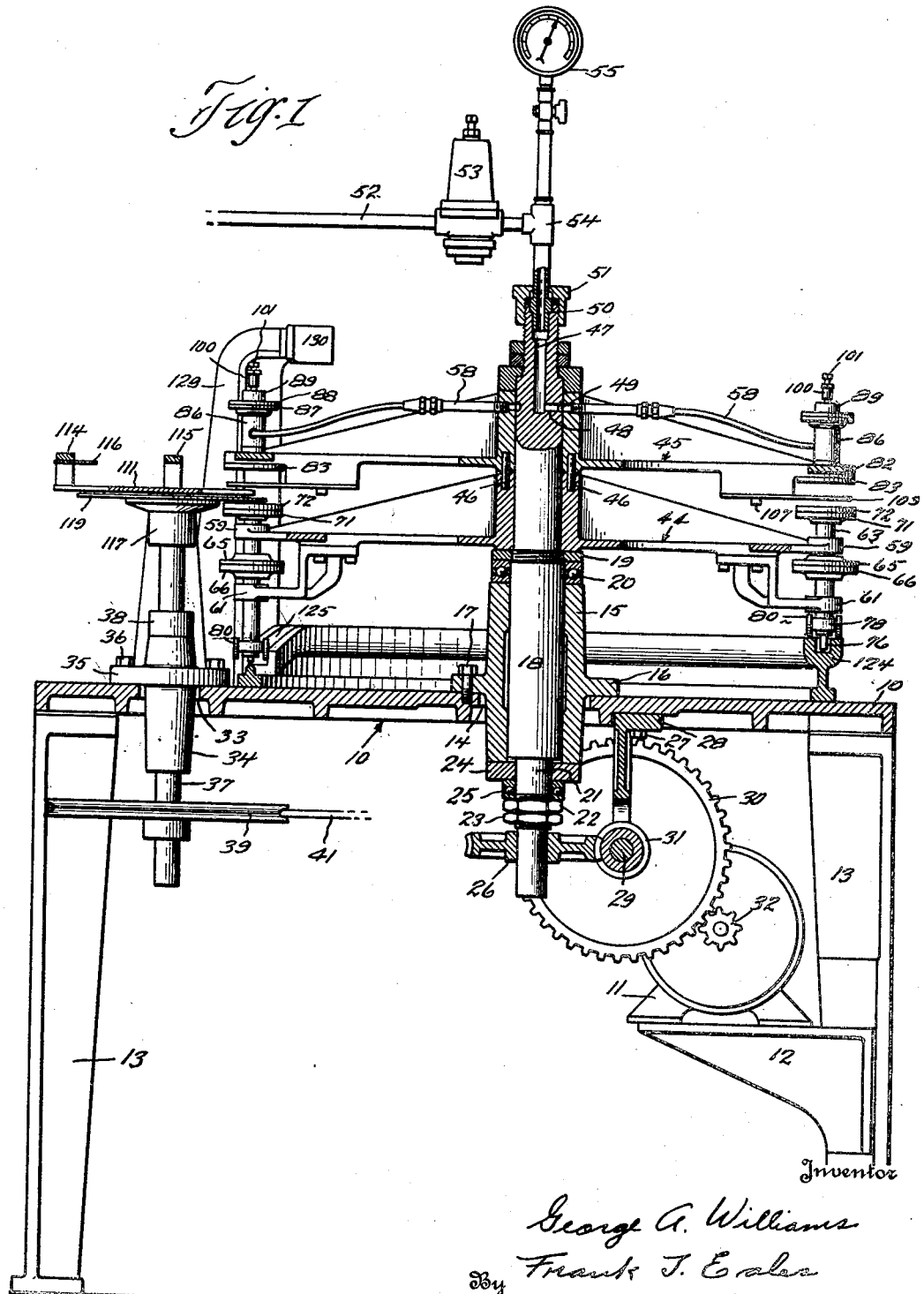

Aug. 16, 1932.                G. A. WILLIAMS ET AL                1,871,935
                                 TESTING MACHINE
                              Filed May 27, 1931          10 Sheets-Sheet 1

Inventor
George A. Williams
Frank T. Ealer
By Hull Brock & West
Attorney

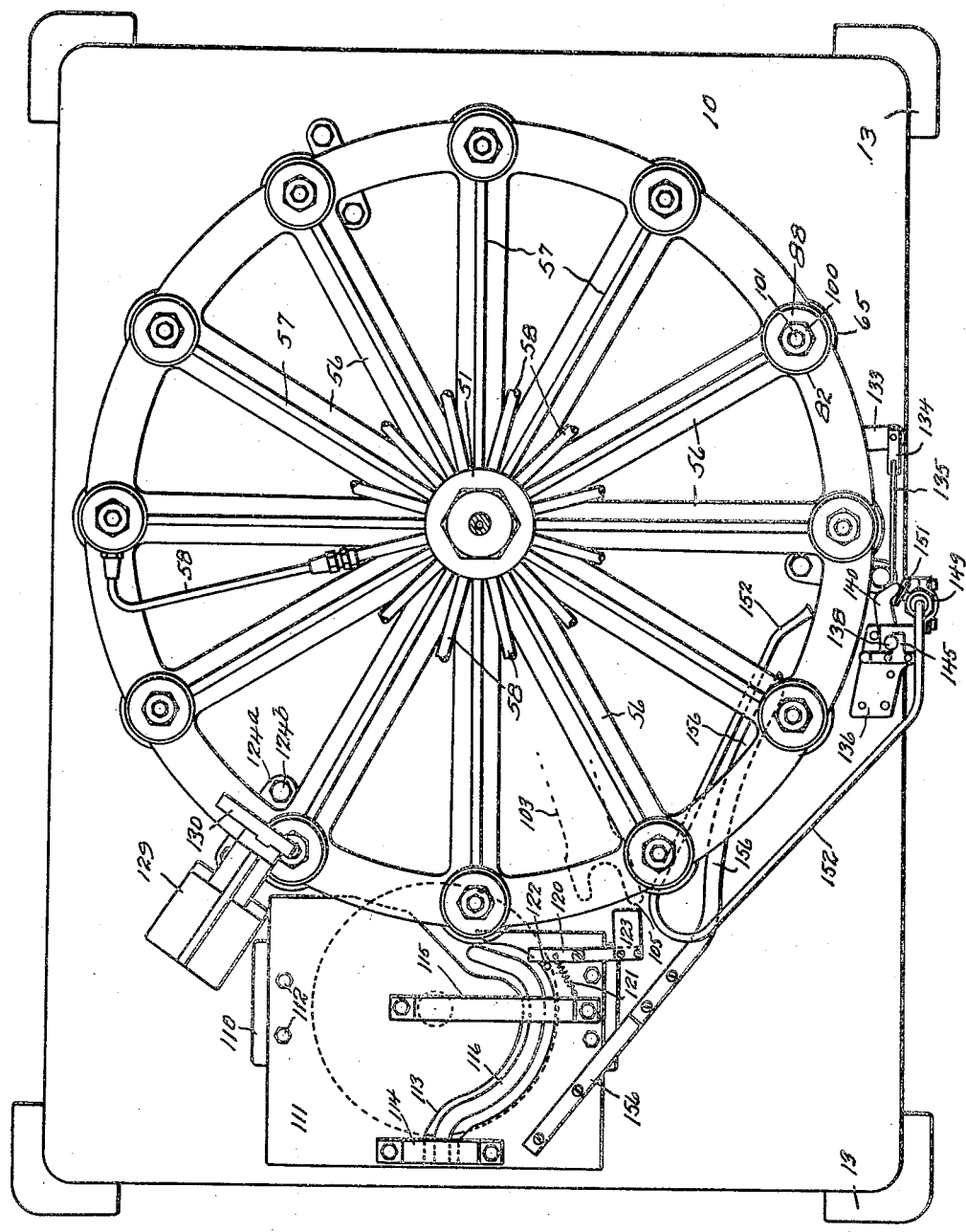

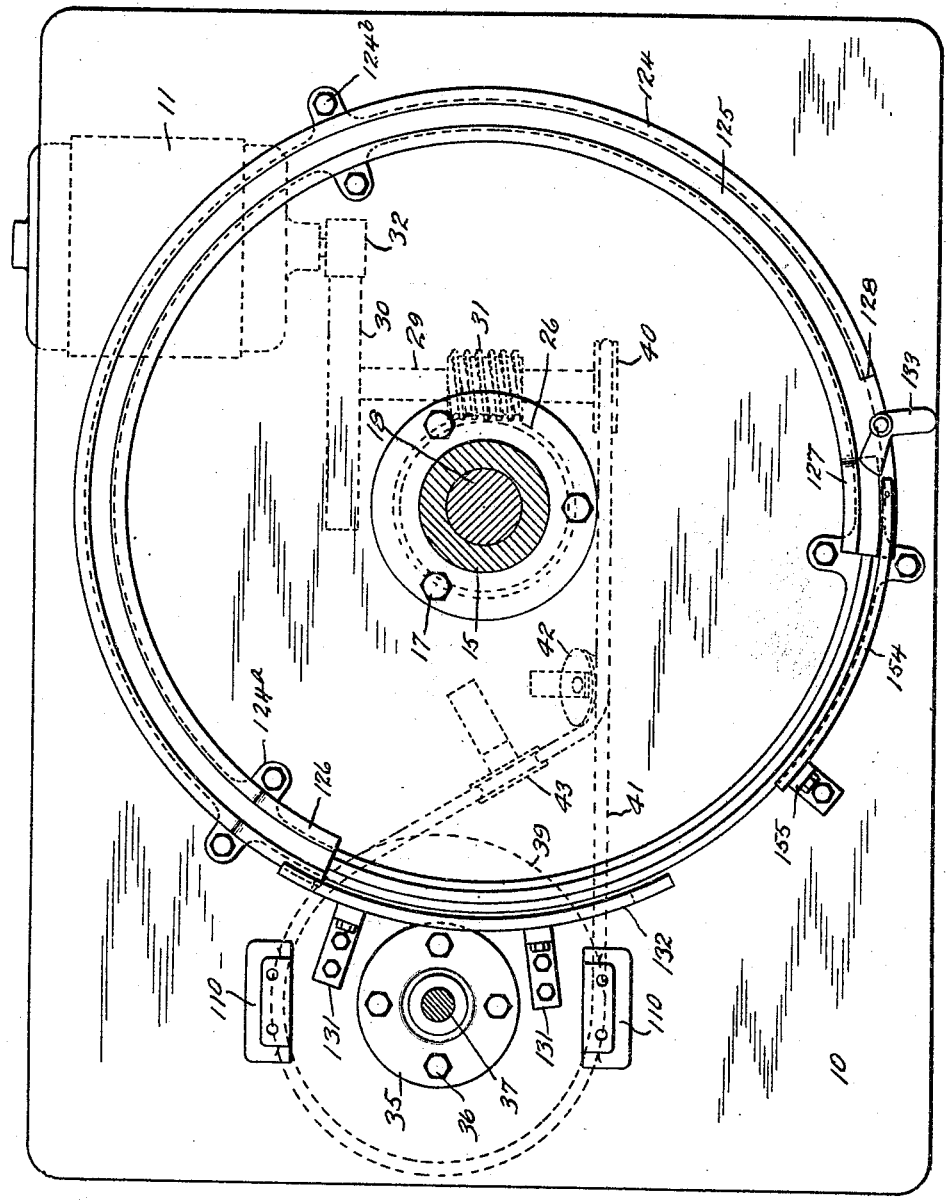

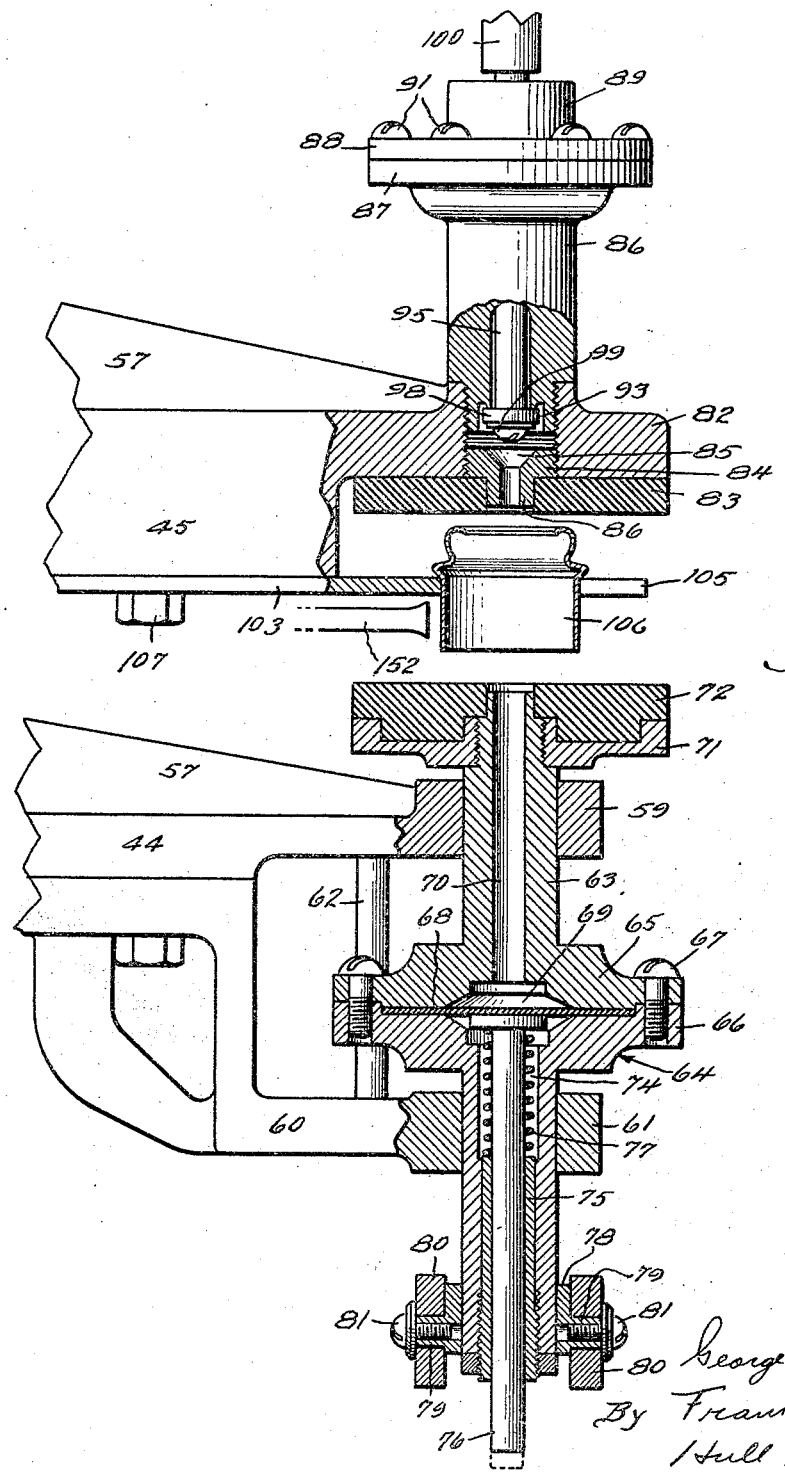

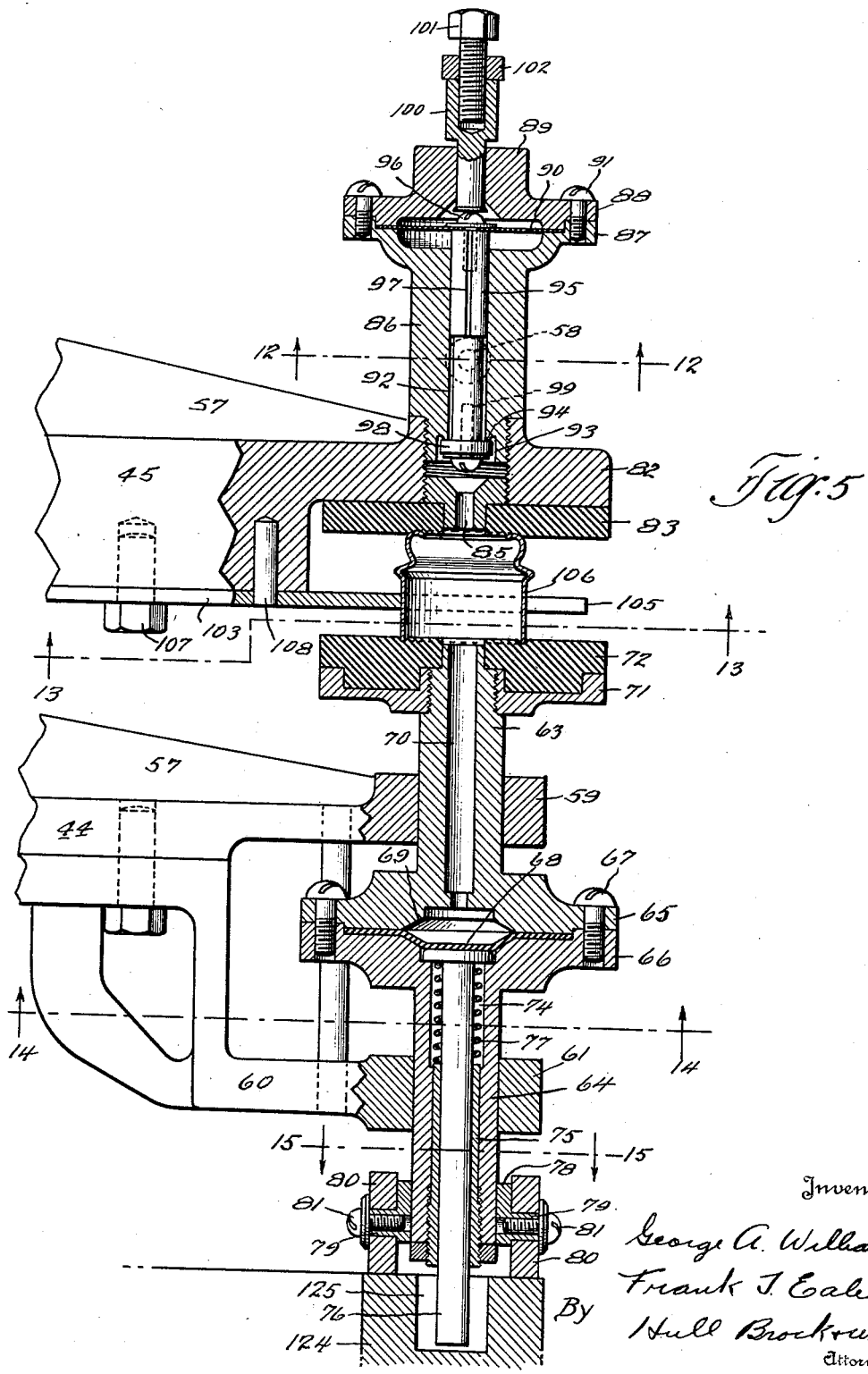

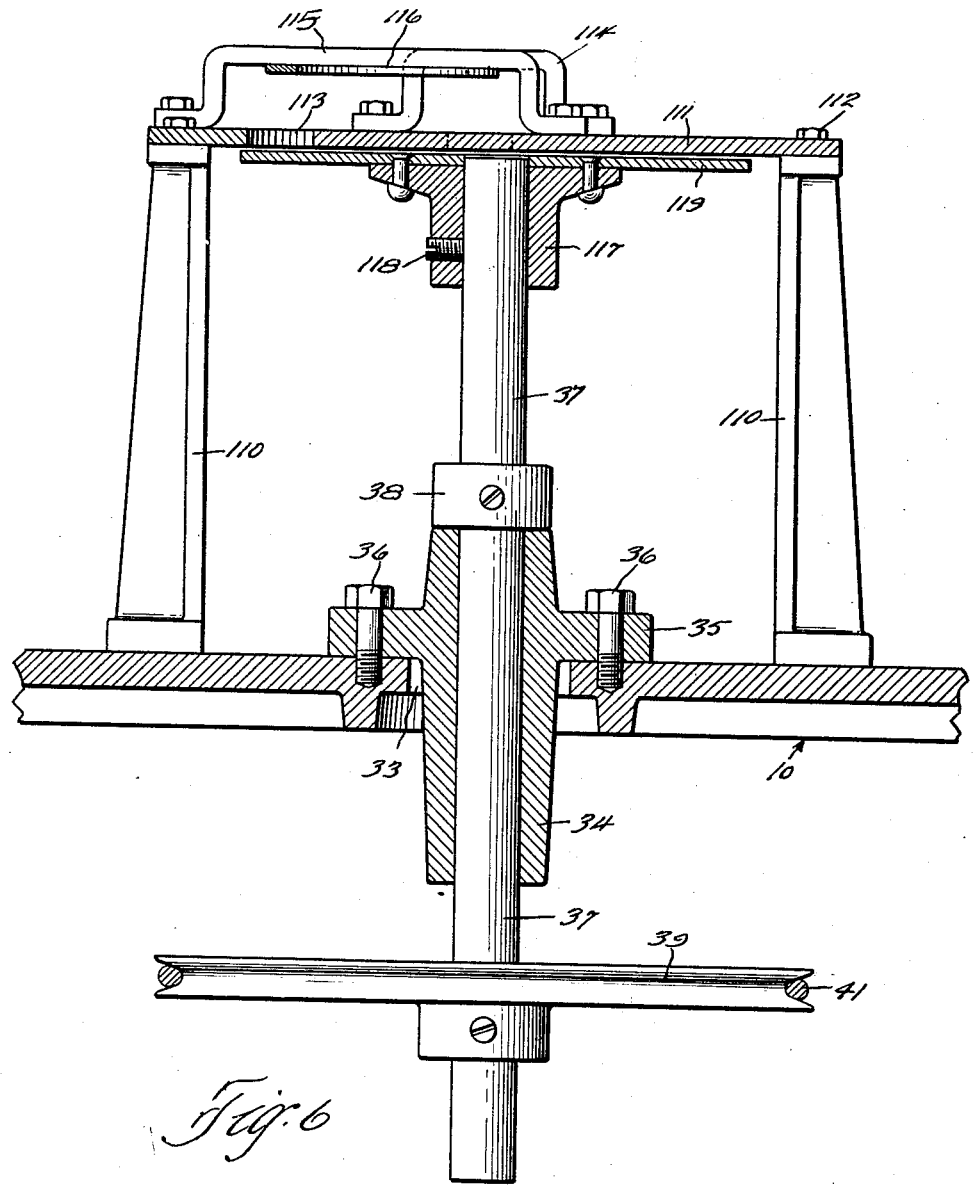

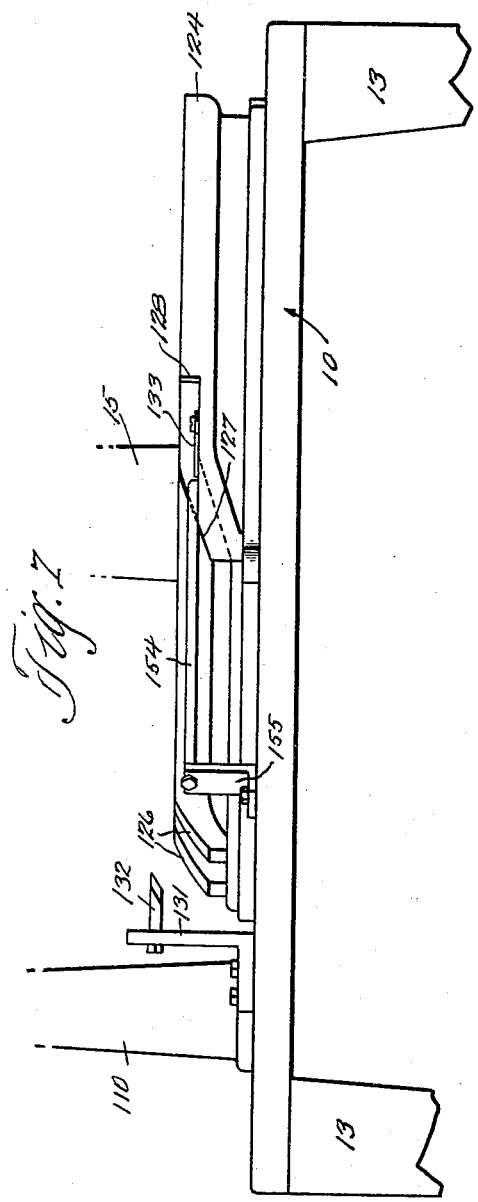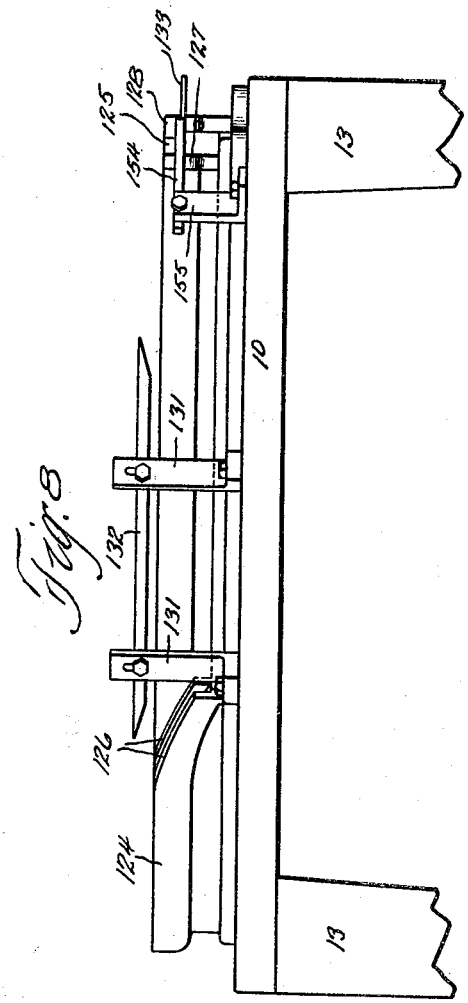

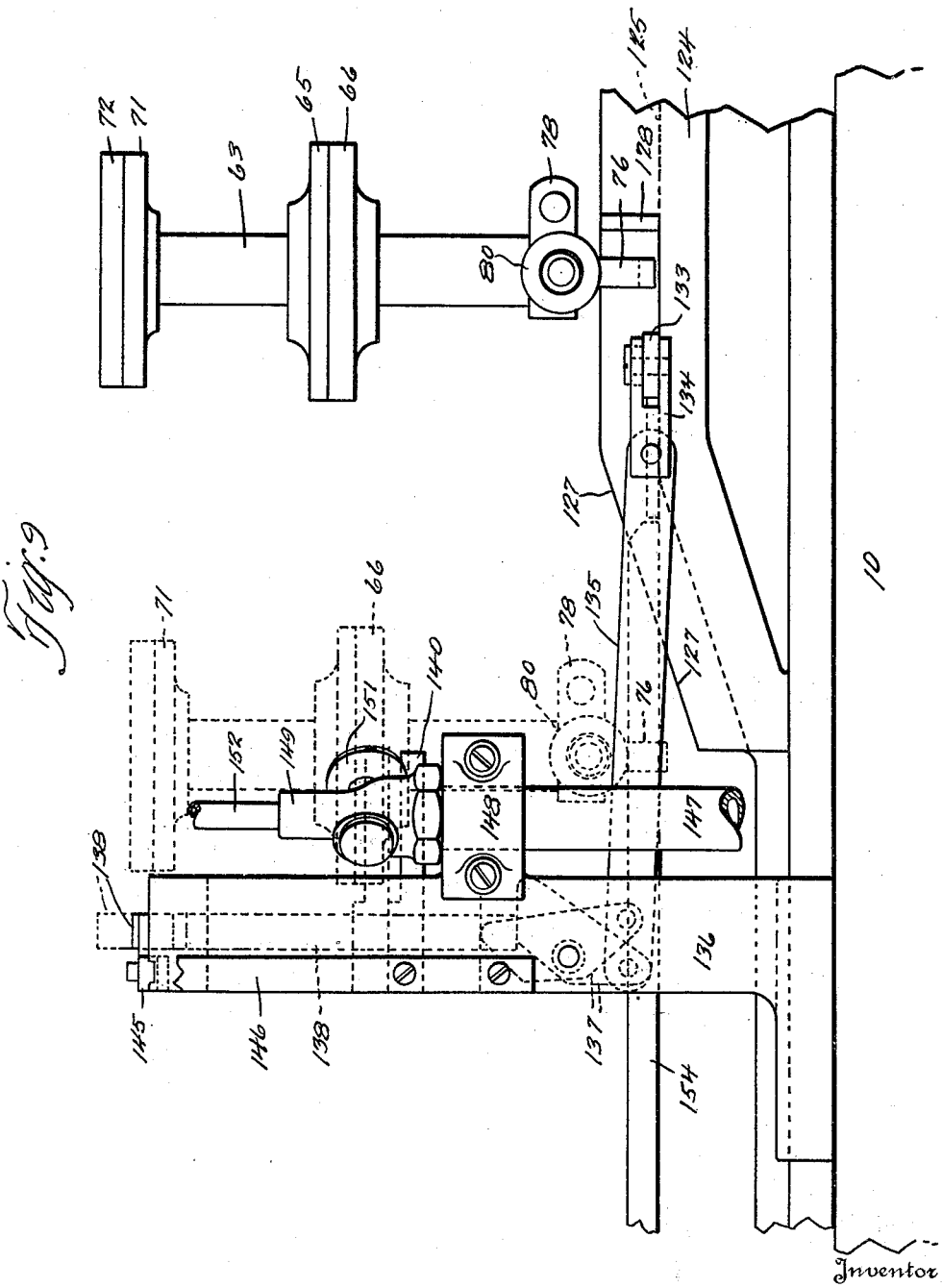

Aug. 16, 1932.  G. A. WILLIAMS ET AL  1,871,935
TESTING MACHINE
Filed May 27, 1931  10 Sheets-Sheet 9
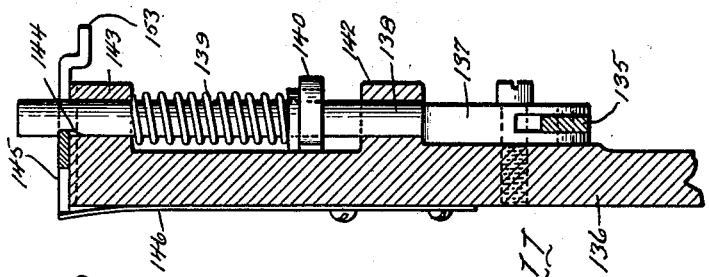
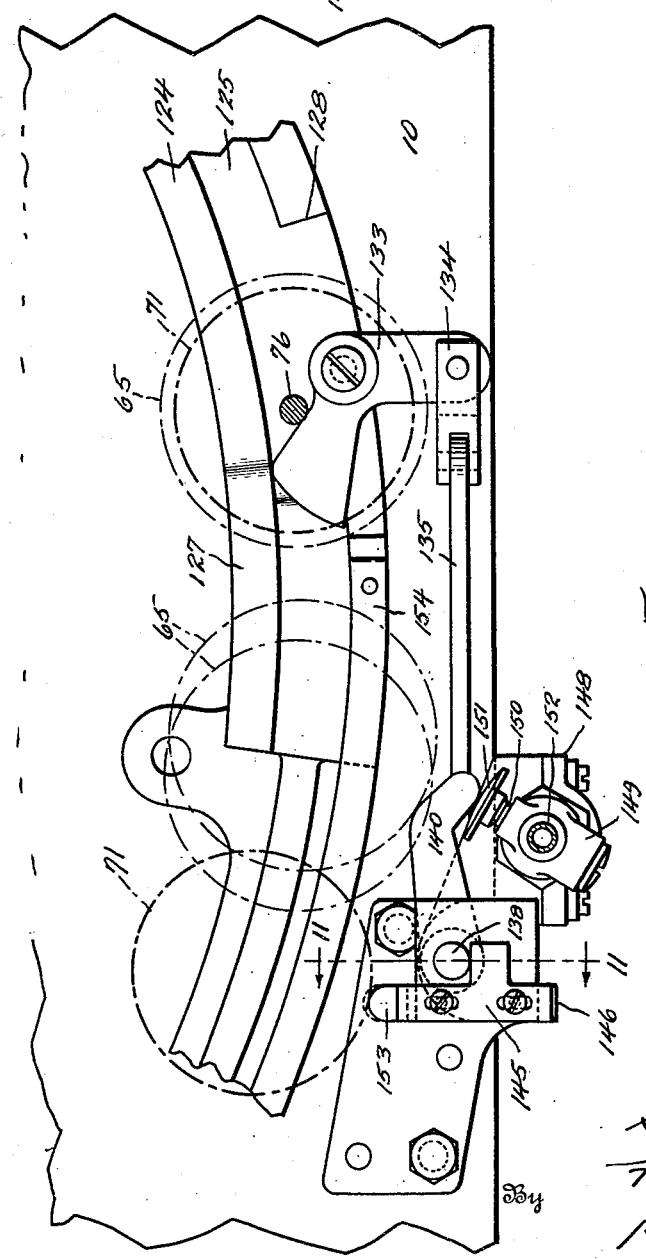
Inventor
George A. Williams
Frank J Eales
Hull Brock + West
Attorney Aug. 16, 1932.  G. A. WILLIAMS ET AL  1,871,935
TESTING MACHINE
Filed May 27, 1931   10 Sheets-Sheet 10
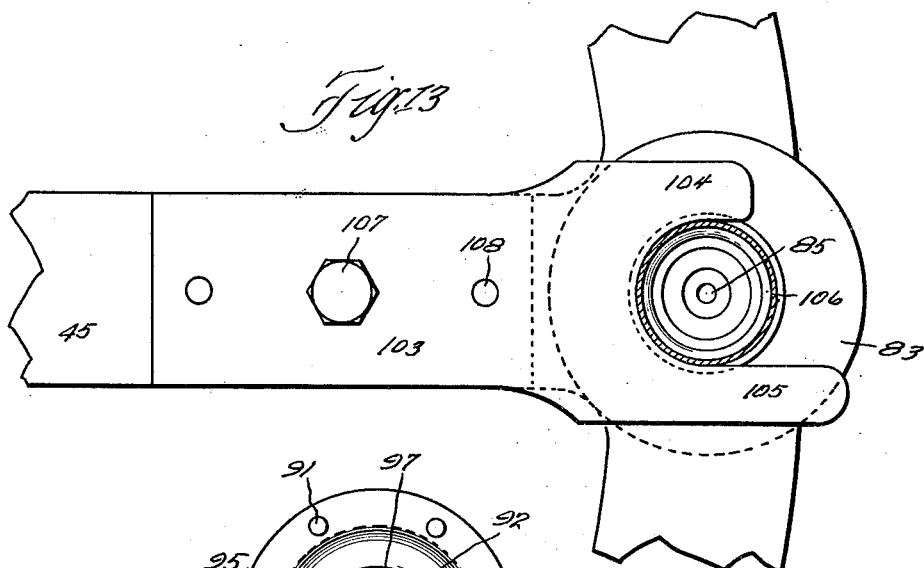
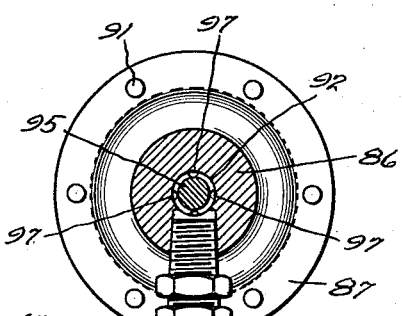
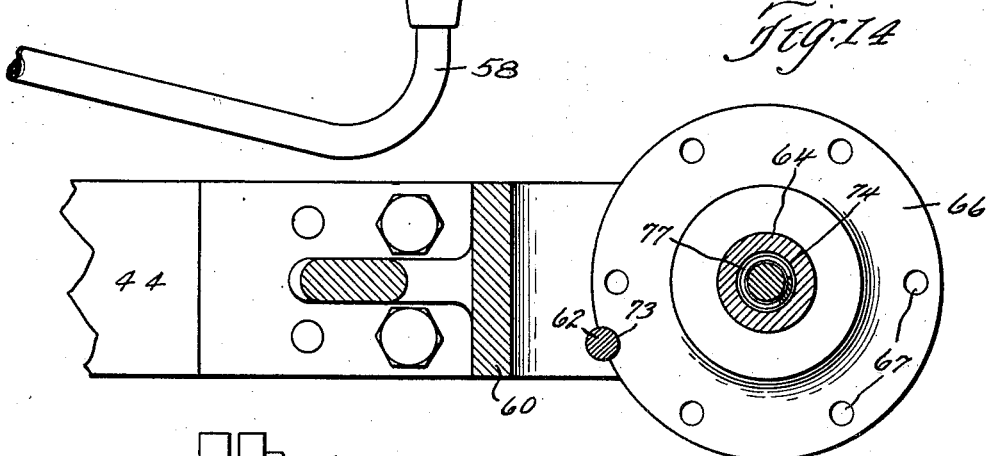
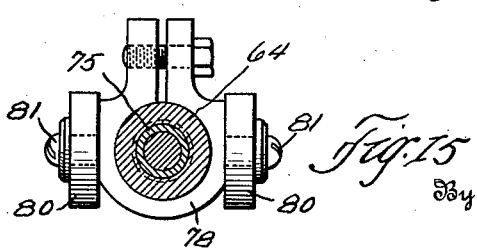

Patented Aug. 16, 1932

1,871,935

UNITED STATES PATENT OFFICE

GEORGE A. WILLIAMS AND FRANK T. EALES, OF DECATUR, ILLINOIS, ASSIGNORS TO WILLIAMS SEALING CORPORATION, OF DECATUR, ILLINOIS, A CORPORATION OF ILLINOIS

TESTING MACHINE

Application filed May 27, 1931. Serial No. 540,268.

This invention relates to testing machines adapted for detecting imperfections in open ended cylindrical articles such as sheet metal receptacle necks or nozzles and for separating the perfect from the imperfect ones.

In the manufacture of sheet metal receptacles which are provided with narrow necks, the necks are usually made separately and soldered into an opening adapted to receive them. In order to prevent spoiling an entire receptacle by soldering thereto a neck or nozzle which is not fluid-tight, it is desirable to test such neck or nozzle for fluid tightness prior to soldering the same in position. Accordingly, the principal object of our invention is to provide a machine adapted for testing open ended nozzles of this character to determine whether they are fluid tight. A further object of our invention is to provide a device which shall close the open ends of the nozzles, create a difference in pressure between the inside and outside of the nozzle and then determine whether such difference of pressure is equalized or partially equalized by leakage through said nozzle within a predetermined time. A further object of our invention is to provide a machine which will accomplish the foregoing objects automatically, discharging perfect nozzles at one point and imperfect nozzles at a different point. Other and more limited objects will become apparent from the following description taken in connection with the accompanying drawings.

Fig. 1 is a central vertical section through one embodiment of our invention; Fig. 2 is a top plan view; Fig. 3 is a horizontal section corresponding substantially to line 3—3 of Fig. 1 with the upper rotating portions removed; Fig. 4 is a detail vertical sectional view through one of the testing units in inoperative position; Fig. 5 is a similar view through a testing unit showing the parts in operative position; Fig. 6 is a detail view partly in vertical section showing the construction of the nozzle feeding mechanism; Figs. 7 and 8 are fragmentary detail elevations showing the construction of the cam track; Figs. 9, 10 and 11 are detail views showing the construction of the ejecting mechanism and related parts; Fig. 12 is a section on the line 12—12 of Fig. 5; Fig. 13 is a section on the line 13—13 of Fig. 5; Fig. 14 is a section on the line 14—14 of Fig. 5; and Fig. 15 is a section on the line 15—15 of Fig. 5.

Referring to the drawings, the numeral 10 indicates a base upon which the various moving parts are supported with the exception of the driving motor 11 which is supported on a bracket 12 from one of the legs 13 which support the base 10. The base 10 is provided more or less centrally with an opening 14 through which extends a bearing member 15 provided with an encircling flange 16 secured to the base 10 as by means of studs 17. Extending through the bearing member 15 is a vertical shaft 18. A collar 19 is threaded on the shaft 18 for rotation therewith and confines between itself and the upper end of the bearing member 15 a ball bearing assembly 20. The shaft 18 is provided with a reduced lower portion 21 having an adjusting nut 22 and lock nut 23 threaded thereon and confining between themselves and the washer 24 a ball bearing assembly 25. Non-rotatably mounted on the lower end of the shaft 18 is a worm wheel 26. Secured to the base 10 by studs 27 are brackets 28 provided at their lower ends with bearings in which is journaled a shaft 29 having affixed thereto a gear 30 and a worm 31. A pinion 32 on the shaft of the motor 11 meshes with the gear 30.

It will be seen that the shaft 18 is rotated by the motor 11 through gear 30, worm 31 and worm wheel 26. In practice it is preferred to use a motor which will be driven at a speed of approximately 1750 R. P. M. and select the gears and worms so that the vertical shaft 18 will be driven at approximately 4 5/8ths R. P. M.

The base 10 is provided near one end with an opening 33 through which extends a bearing member 34. The member 34 is provided with an encircling flange 35 which is secured to the base 10 as by means of studs 36. A shaft 37 is rotatably mounted in the bearing member 34 and held against downward sliding by means of a collar 38. The shaft 37 has non-rotatably mounted thereon near its lower end a pulley 39. The shaft 29 has mounted at one end thereof (see Fig. 3) a small pulley 40. A belt 41 is trained over pulleys 39 and 40 and guided by means of idler pulleys 42 and 43 carried by the base 10.

*Testing units*

Fixed on the shaft 18 are a pair of spiders 44 and 45. These spiders are fixed with respect to each other by dowel pins 46. The upper end of the shaft 18 is drilled as indicated at 47 and has a passage 48 connecting the bore 47 with an encircling groove 49. Received in the upper portion of the bore 47 is a fitting 50 which is fixed and with respect to which the shaft 18 rotates. A gland nut 51 serves to prevent escape of air between the fitting 50 and shaft 18. A compressed air line 52 communicates through a suitable reducing valve 53 with the fitting 50. A T-connection 54 permits the connection of a gauge 55 for indicating the pressure applied to the fitting 50. The spiders 44 and 45 are each provided with twelve spokes 56 each of which has a strengthening rib 57. Mounted at the end of each of the spokes is a testing unit. Each testing unit is supplied with compressed air from the air line 52 through the passages 47, 48 and 49 and tubes 58. Inasmuch as the twelve testing units are of identical construction, only one will be described.

The spider 44 is provided at the end of each spoke with a bearing portion 59 and has attached thereto a bracket 60 which is provided with a bearing portion 61 in alignment with that 59. Extending between the portions 59 and 61 is a pin 62. Slidable in the bearing portions 59 and 61 is the lower nozzle closing assembly. This assembly comprises a pair of castings 63 and 64 having shank portions slidable in the bearing portions 59 and 61 and having cooperating flanges 65 and 66 secured together as by screws 67. Confined between the flanges 65 and 66 is a rubber diaphragm 68. The member 63 is provided with a concavity 69 adjacent the diaphragm 68 and constitutes therewith an expansible chamber. The shank of the member 63 is provided with a bore 70 communicating with the concavity 69. Threaded on the upper end of the member 63 is a plate 71 which carries a rubber gasket 72. It will be seen that the gasket 72 has a central opening which communicates through the passage 70 with the expansible chamber 69. The flanges 65 and 66 are provided with aligned notches 73 (see Fig. 14) which receive the pin 62 to prevent rotary motion of the lower nozzle closing assembly. The member 64 has a shank slidable in the bearing portion 61 and is provided with a large central bore 74. The lower end of the bore 74 is threaded and adapted to receive a sleeve 75. An ejector member 76 comprising a headed pin is received in the bore 74. A helical spring 77 surrounds the ejector member 76 and urges the same against the diaphragm 68. Secured to the lower end of the member 64 is a yoke 78 which is fixedly carried by the lower end of the shank of the member 64 and is provided with trunnions 79 upon which are mounted wheels 80 secured in position by flanged screws 81.

The spider 45 is provided at the end of each spoke with a nozzle closing member 82 which has mounted thereon a rubber gasket 83 which is adapted to engage the nozzle. The gasket 83 may be secured in position by means of a threaded member 84 threaded into the lower end of the threaded bore which extends through the portion 82. The member 84 is provided with a central passage 85 and an extension 86 which frictionally grips the gasket 83. Threaded into the upper end of the bore which extends through the portion 82 is an air supply mechanism including a casting 86 and related parts and contstituting with the members 82 and 83 the upper nozzle closing assembly. The casting 86 is provided with a flange 87 which cooperates with a flange 88 on a guide member 89 for clamping in sealing relation over the opening through the casting 86 a flexible diaphragm 90. Screws 91 urge the flanges 87 and 88 toward each other. The casting 86 is provided with a central opening 92 having an enlarged lower portion 93 and provided with a valve seat 94. A plunger 95 is carried by the diaphragm 90, being secured thereto by means of the screw 96 passing through a sealing washer and threaded into the plunger 95. Longitudinal grooves 97 insure the free passage of air along the plunger 95 while allowing the same to be of a size sufficient to guide said plunger accurately. The lower portion of the plunger 95 is reduced and carries a valve member 98 which has a suitable rubber seat and is held in position by a screw 99. Slidably received by and extending through the member 89 is a plunger actuating pin 100 which is provided with an adjustable screw 101 and a lock washer 102 for holding such screw in any adjusted position. Attached to the spider 45 are nozzle supports 103 consisting of bifurcated members each having one short arm 104 and a longer arm 105. The opening between the arms 104 and 105 will be shaped to conform to the shape of the nozzles 106 which are to be tested. The nozzle supports may be attached as by means of studs 107 and held against rotation about such studs by pins 108.

*Feed mechanism*

Mounted on the table 10 at either side of the opening 33 are a pair of brackets 110. Supported on these brackets is a plate 111 secured thereto as by means of studs 112 and provided with a guide slot 113. Supported on the plate 111 are a pair of U-shaped irons 114 and 115. A top guide strip 116 conforming to the shape of the guide slot 113 is supported on the lower surfaces of the irons 114 and 115. Mounted on the upper end of the shaft 37 is a hub 117 adjustably attached thereto by a set screw 118 and carrying a feed plate 119 which may be secured thereto in any suitable manner. It will be noted that the feed plate 119 is positioned closely adjacent the lower surface of the plate 111. It will be understood that caps are supplied to the guide slot 113 by any suitable conveying mechanism which may or may not embody means for orienting the nozzles. Nozzles in the guide slot 113 will be held against vertical displacement by the strip 116 and feed plate 119. The rotation of the feed plate will urge the nozzles toward the rotating member which carries the testing units. Pivotally mounted on the plate 111 is a dog 120 which is normally held in the position shown in Fig. 2 by a spring 121 against a stop pin 122. This dog will hold nozzles from passing beyond it until it is tripped by engagement of the long arm 105 of the nozzle support 103 engaging against the projection 123. While the nozzle support 103 is shown in Fig. 2 in advance of the spoke 56 of the spider 45, it is to be understood that this is merely for convenience of illustration and that said support is actually positioned, as hereinbefore described in connection with Fig. 4, so as to support the nozzle in axial alignment with the passages 70 and 85. By the use of the tripping mechanism just described, one nozzle at a time is allowed to advance along the groove 113 beyond the dog 120 to be received in the bifurcation of the nozzle support 103.

*Testing unit control*

Mounted on the table 10 as by lugs 124ª and studs 124ᵇ is a cam track 124 which is provided with a central groove 125 for reception of the ejector element 76. The cam track 124 begins somewhat beyond the opening of the guide slot 113 with an ascending portion 126, continuous nearly three-fourths of the circle and terminates in a descending portion 127, the outer portion terminating in advance of the inner portion by an abrupt termination at 128.

It will be obvious that when the wheels 80 of each testing unit engage the portion 126 of the cam track 124, the lower closing member will be elevated into gripping relation with the nozzle carried by the nozzle support 103. Mounted on the base 10 adjacent the path of the testing units is a bracket 129 provided with an overhanging upper end portion carrying a cam 130 which is adapted to engage the head of the set screw 101 whereby to depress the plunger 95 and admit air past the valve 94, 98 to the interior of the nozzle 106. A curved strip 154 has one end supported on the track 124 at a distance from the termination 128 and the other on a bracket 155. This strip extends as a continuation of the track 124, is engaged by one of the rollers 80 and serves to position the lower closing member for performance of its ejecting function, hereinafter described. Mounted on the base 10 are a pair of brackets 131 supporting a curved guide member 132 which is adapted to engage the upper edge of the wheels 80 to insure downward reciprocation of the lower nozzle closing assembly.

*Ejecting mechanism*

Pivotally mounted on the cam track is a bent lever 133 having a cam portion extending into the groove 125 of the cam track and adapted to be engaged by the ejector member 76 when the same is in down position, while clearing the same when in up position. Connected to the other arm of the lever 133 is a link 134 which in turn is connected to a link 135. Mounted on the base 10 is a bracket 136 which carries most of the parts of the ejecting mechanism. The link 135 connects with a cam lever 137 mounted on the bracket 136 which in turn actuates a vertically reciprocable rod 138. The rod 138 is normally spring-pressed downwardly by a spring 139 engaging against a cam finger 140 carried by said rod. The rod 138 is guided in ears 142 and 143, the spring 139 engaging against the ear 143. The rod 139 is provided with a notch 144. A sliding latch member 145 is carried by the bracket 136 and normally urged toward the rod 138 by a leaf spring 146. A conduit 147 of a compressed air line is supported on the bracket 136 by suitable clamping means 148 and is provided with a valve 149 controlled by a sliding part 150 which carries a button 151 at the end thereof. The button 151 has a part-spherical or rounded outer surface. When the rod 138 with its cam finger 140 is in down position, the cam finger 140 is below the path of the flange 66, but when the rod 138 is in up position, the cam finger 140 is in the path of the flange 66, as well as opposite the valve-control button 151. The valve 149 will therefore be opened by the said flange when the rod 138 is in up position. The opening of the valve 149 results in directing a blast of air against a nozzle carried in the nozzle support 103, the air escaping from the end of the pipe 152 which extends between the upper and lower closing members and terminates adjacent the inner surface of the nozzle, as indicated schematically in Fig. 4. If the member 76 is in up position, the compressed air ejecting mechanism just described will not be actuated. The sliding member 145 has a projecting portion 153 which is engaged by the flange 66 after the cam finger 140 has been operated to move the valve 149. This operation urges the slide 145 inwardly against the action of the spring 146 a sufficient distance to allow the rod 148 to return to normal "down" position under the influence of the spring 139. The flange 66 is positioned exactly opposite the valve-control button 151 by the auxiliary track member 154 which is supported at one end on the cam track member, as clearly shown in Fig. 7, and at the other end on a bracket 155 mounted on the base 10.

A cam member 156 is supported on the plate 111 and projects into the space between the upper and lower nozzle closing members whereby to cam out imperfect nozzles which are not ejected by the compressed air ejector.

*Operation*

In operation, the nozzles will be supplied to the guide slot 113 either manually or by any suitable feeding mechanism, such as an orienting chute leading from a suitable hopper. The rotation of the disk 119 will continually urge the nozzles along said slot into engagement with the dog 120. Each time the long arm 105 of one of the nozzle supports 103 engages the projection 123, the dog 120 will be pivoted away from the stop 122 and will release one nozzle for feeding to the approaching testing unit. As the support 103 approaches, the released nozzle will be fed thereinto. After the nozzle is thus supported in proper operative relation to the closing members of the testing unit, the lower said closing member will be elevated by reason of the rollers 80 engaging against the beveled portion 126 of the cam track 124. The nozzle 106 will then be gripped firmly between the gaskets 72 and 83, as clearly shown in Fig. 5, thereby closing both the open ends thereof. As the member 100 passes under the cam 130, the screw 101 will engage said cam, thereby urging the plunger 95 downwardly and opening the valve 94, 98. This will result in the admission of fluid under pressure to the interior of the nozzle 106 and the depression of the diaphragm 68 against the action of the spring 77. The plunger or ejector member 76 which is urged upwardly by the spring 77 will thus be depressed to the position shown in Fig. 5. Inasmuch as the cam 130 is short, the plunger 95 will be allowed to resume its upward position very shortly after being depressed. The chamber defined by the nozzle 106 and the passages which communicate with it below the valve member 94 will be filled with fluid under a pressure depending on the pressure admitted by the regulating valve 53. If the nozzle leaks, the compressed fluid will escape and the plunger 76 will return to the position shown in Fig. 4. If the nozzle is perfect, the plunger 76 will be held in depressed position.

If the plunger 76 is down, as in the case of a good nozzle, it will engage the member 133 which, acting through the links 134 and 135, will cause the rod 138 to be elevated to such an extent that the sliding member 145 will engage in the notch 144 thereof to retain it so elevated. The cam finger 140, which is fixedly carried by the rod 138, will be elevated by said rod to a position level with the center of the valve-control button 151. In this position the finger 140 will be engaged by the flange 66 when the same passes, as is clearly indicated in Fig. 10. This engagement will result in actuation of the valve 149 to direct a jet of compressed air against the nozzle carried in the nozzle support 103, resulting in the ejection of such nozzle from the machine into a suitable receptacle, conveyor or the like. After the testing unit, the flange 66 of which has actuated the valve 149, has passed beyond ejecting position, the member 71 thereof will engage the end 153 of the slide 145 and move the same against the action of spring 146 to release the rod 138 whereby to return the cam finger 140 to "down" position. In the event the nozzle is imperfect, the charge of compressed air will leak away and allow the member 76 to return under the impulsion of the spring 77 to "up" position. In this case, the lever 133 will not be actuated and the nozzle will be carried past the compressed air ejector and cammed out of the nozzle support by the cam strip 156 whereby to be discharged into a waste receptacle or the like.

While we have shown and described a preferred embodiment of our invention, we wish it understood that we may carry out the same in numerous variant forms and that we are not limited except by the scope of the appended claims and the prior art.

Having thus described our invention, what we claim is:—

1. In a device of the class described, a base, a testing unit rotatably mounted thereon and comprising cooperating closing members, each provided with an opening, a conduit communicating with one of said openings, provided with a normally closed valve and adapted to be connected with a source of compressed air, a second conduit communicating with the other opening and with an expansible chamber, means tending to reduce the volume of said chamber and an ejector element movable responsive to pressure in said chamber, means operatively associated with said base for feeding nozzles to said testing unit, means for momentarily opening said valve, an ejector means responsive to the position of said ejector element for ejecting perfect nozzles, and means for removing imperfect nozzles.

2. In a device of the class described, a base, a testing unit rotatably mounted thereon and comprising, cooperating closing members, each provided with an opening, a conduit communicating with one of said openings, provided with a normally closed valve and adapted to be connected with a source of compressed air, a second conduit communicating with the other opening and with an expansible chamber, means tending to reduce the volume of said chamber and an ejector element movable responsive to pressure in said chamber, means for momentarily opening said valve, an ejector means responsive to the position of said ejector element for ejecting perfect nozzles, and means for removing imperfect nozzles.

3. In a device of the class described: a base; a testing unit rotatably mounted thereon and comprising, cooperating closing members, one of which is movable with respect to the other, each provided with an opening, a conduit communicating with one of said openings, provided with a normally closed valve and adapted to be connected with a source of compressed air, a second conduit communicating with the other opening and with an expansible chamber, means tending to reduce the volume of said chamber and an ejector element movable responsive to pressure in said chamber; means for momentarily opening said valve; an ejecting means responsive to the position of said ejector element for ejecting perfect nozzles; and means for removing imperfect nozzles.

4. In a device of the class described: a base; a testing unit rotatably mounted thereon and comprising, cooperating closing members, one of which is movable with respect to the other, each provided with an opening, a conduit communicating with one of said openings, provided with a normally closed valve and adapted to be connected with a source of compressed air, a second conduit communicating with the other opening and with an expansible chamber, means tending to reduce the volume of said chamber and an ejector element movable responsive to pressure in said chamber, and a nozzle support mounted between said cooperating closing members; means for momentarily opening said valve; an ejector means responsive to the position of said ejector element for ejecting perfect nozzles; and means for removing imperfect nozzles.

5. In a device of the class described; a base, a vertical shaft rotatable on said base; means for rotating said shaft; means carried by said shaft for supporting a testing unit, said testing unit comprising upper and lower closing members adapted to grip a nozzle and close the upper ends thereof, a nozzle supporting means mounted between said closing members, conduit means having its interior communicating through one of said closing members with the interior of a gripped nozzle whereby a compressed gas may be admitted thereto, and means operatively associated with the other said closing member and responsive to pressure within said nozzle for moving an ejector member from a normal to an operative position; a cam track on said base and concentric with said vertical shaft adapted to cooperate with one of said closing members to effect gripping of the nozzle to be tested; an ejecting means adapted to be operated if the ejector member is in operating position, and means operatively associated with said base for momentarily admitting compressed air to the nozzle being tested.

6. In a device of the class described: a base; a vertical shaft rotatably mounted on said base; means for rotating said shaft; a cam track on said base concentric with said shaft; a testing element non-rotatably mounted on said vertical shaft and having its functional parts spaced therefrom, said testing element comprising, a fixed upper nozzle closing member having a nozzle support mounted thereon and a vertically reciprocable lower closing member in axial alignment with said upper closing member and having a cam follower cooperating with said cam track for causing gripping and releasing of nozzles between said closing members, said upper member being provided with a normally closed, spring-valve-controlled air supply passage adapted to be connected to a source of compressed air, said lower closing member being provided with an expansible chamber and an ejector member cooperating with a wall of said expansible chamber and responsive to pressure in said chamber for assuming an operative or inoperative position; means operatively associated with said base for temporarily admitting compressed air to the interior of said nozzle and said expansible chamber, and ejecting mechanism responsive to the position of said ejector member for ejecting or not ejecting a nozzle.

7. In a device of the class described, a base, a vertical shaft rotatable on said base, means for rotating said shaft, means carried by said shaft and supporting a testing unit, said testing unit comprising upper and lower closing members adapted to grip a nozzle and close the upper ends thereof, a nozzle supporting means mounted between said closing members, means communicating through one of said closing members with the interior of said nozzle for creating a pressure therein, and means including an expansible container operatively associated with the other said closing member and responsive to pressure within said nozzle for moving an ejector member from a normal to an operative position, a cam track on said base and concentric with said vertical shaft adapted to cooperate with one of said closing members to effect gripping of the nozzle to be tested, an ejecting means adapted to be operated if the ejector member is in operating position, and means operatively associated with said base for momentarily admitting compressed air to the nozzle being tested and for retaining such air in the absence of leaks in the nozzle.

8. In a device of the class described: a base; a vertical shaft rotatably mounted on said base; means for rotating said shaft; a cam track on said base concentric with said shaft; a testing element non-rotatably mounted on said vertical shaft and having its functional parts spaced therefrom, said testing element comprising, a fixed upper nozzle closing member having a nozzle support mounted thereon and a vertically reciprocable lower closing member in axial alignment with said upper closing member and having a cam follower cooperating with said cam track for causing gripping and releasing of nozzles between said closing members, said upper member being provided with a normally closed, spring-valve-controlled air supply passage adapted to be connected to a source of compressed air, said lower closing member being provided with an expansible chamber and an ejector member cooperating with a wall of said expansible chamber and responsive to pressure in said chamber for assuming an operative or inoperative position; means operatively associated with said base for temporarily admitting compressed air to the interior of said nozzle and said expansible chamber and an ejecting mechanism having a part in the path of said ejector member when the same is in operative position serving to cause ejection of perfect nozzles.

9. In a device of the class described, a base, a vertical shaft rotatable on said base, means for rotating said shaft, means carried by said shaft and supporting a testing unit, said testing unit comprising upper and lower closing members adapted to grip a nozzle and close the upper ends thereof, a nozzle supporting means mounted between said closing members, means communicating through one of said closing members with the interior of said nozzle for creating a pressure therein, and means including an expansible container and means constraining same to a predetermined normal volume operatively associated with the other said closing member and responsive to pressure within said nozzle for moving an ejector member from a normal to an operative position, a cam track on said base and concentric with said vertical shaft adapted to cooperate with one of said closing members to effect gripping of the nozzle to be tested, an ejecting means adapted to be operated if the ejector member is in operating position, and means operatively associated with said base for momentarily admitting compressed air to the nozzle being tested and for retaining such air in the absence of leaks in the nozzle.

10. In a device of the class described: a base; a vertical shaft rotatably mounted on said base; means for rotating said shaft; a cam track on said base concentric with said shaft; a testing element non-rotatably mounted on said vertical shaft and having its functional parts spaced therefrom, said testing element comprising a fixed upper nozzle closing member having a nozzle support mounted thereon and a vertically reciprocable lower closing member in axial alignment with said upper closing member and having a cam follower cooperating with said cam track for causing gripping and releasing of nozzles between said closing members, said upper member being provided with a normally closed, spring-valve-controlled air supply passage adapted to be connected to a source of compressed air, said lower closing member being provided with an expansible chamber and an ejector member cooperating with said expansible chamber and responsive to pressure in said chamber for assuming an operative or inoperative position, and both said closing members being provided with deformable nozzle engaging gaskets; means operatively associated with said base for temporarily admitting compressed air to the interior of said nozzle and said expansible chamber; and an ejecting mechanism having a part in the path of said ejector member when the same is in operative position and serving to eject perfect nozzles, said ejector further including a cam finger shiftable from inoperative to operative position by said part acting through a linkage and adapted when in operative position to be urged by a part of said lower closing member against a valve button carried by said base, a compressed air line having a valve therein controlled by said button and terminating adjacent the path of a nozzle being tested whereby to discharge the latter.

In testimony whereof, we hereunto affix our signatures.

GEORGE A. WILLIAMS.
FRANK T. EALES.